(12) United States Patent
Cabodi et al.

(10) Patent No.: US 8,796,167 B2
(45) Date of Patent: Aug. 5, 2014

(54) REFRACTORY PRODUCT HAVING HIGH ZIRCONIA CONTENT

(75) Inventors: Isabelle Cabodi, Cavaillon (FR); Michel Gaubil, Les Angles (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 33 days.

(21) Appl. No.: 13/575,568

(22) PCT Filed: Jan. 28, 2011

(86) PCT No.: PCT/IB2011/050387
§ 371 (c)(1),
(2), (4) Date: Oct. 9, 2012

(87) PCT Pub. No.: WO2011/092656
PCT Pub. Date: Aug. 4, 2011

(65) Prior Publication Data
US 2013/0152636 A1   Jun. 20, 2013

(30) Foreign Application Priority Data

Jan. 28, 2010 (FR) .................................. 10 50601

(51) Int. Cl.
*C04B 35/484* (2006.01)
*C03B 5/43* (2006.01)
*C04B 35/48* (2006.01)

(52) U.S. Cl.
CPC ............... *C03B 5/43* (2013.01); *C04B 35/481* (2013.01); *C04B 35/484* (2013.01); *C04B 2235/3248* (2013.01)
USPC .......................................... 501/105; 501/107

(58) Field of Classification Search
CPC ...... C03B 5/43; C04B 35/481; C04B 35/484; C04B 2235/3248
USPC ................... 501/103, 105, 106, 107
See application file for complete search history.

(56) References Cited

U.S. PATENT DOCUMENTS

| | | | |
|---|---|---|---|
| 4,705,763 A | 11/1987 | Hayashi et al. | |
| 5,466,643 A | 11/1995 | Ishino | |
| 7,598,195 B2 * | 10/2009 | Gupta et al. | 501/105 |
| 7,687,422 B2 * | 3/2010 | Boussant-Roux et al. | 501/105 |
| 8,273,673 B2 * | 9/2012 | Cabodi et al. | 501/105 |
| 8,309,482 B2 * | 11/2012 | Gaubil et al. | 501/105 |
| 8,563,454 B2 * | 10/2013 | Gaubil et al. | 501/105 |
| 2007/0249481 A1 | 10/2007 | Gupta | |
| 2009/0038936 A1 * | 2/2009 | Boussant-Roux et al. | 204/242 |
| 2010/0068492 A1 * | 3/2010 | Boussant-Roux et al. | 428/220 |
| 2011/0212826 A1 * | 9/2011 | Cabodi et al. | 501/104 |
| 2012/0046156 A1 * | 2/2012 | Gaubil et al. | 501/104 |

FOREIGN PATENT DOCUMENTS

| | | |
|---|---|---|
| DE | 4403161 A1 | 8/1994 |
| EP | 0403387 B1 | 6/1990 |
| FR | 2701022 A | 1/1994 |
| FR | 2897861 A1 | 8/2007 |
| FR | 2897862 A1 | 8/2007 |
| JP | 63285173 A | 11/1983 |
| JP | 2000302560 A | 10/2000 |
| JP | 2003292382 A | 10/2003 |
| JP | 1004099441 * | 4/2004 |
| WO | 2005068393 A1 | 7/2005 |
| WO | 2007099253 A1 | 9/2007 |
| WO | 2009027610 A2 | 3/2009 |

OTHER PUBLICATIONS

International Search Report for PCT/IB2011/050387 dated Feb. 5, 2011.
French Search Report for FR 1050601 dated May 25, 2010.
Boussuge, Michel, "Investigation of the Thermomechanical Properties of Industrial Refractories: The French Programme Prometheref", J. Mater Sci. (2008) vol. 43, Jan. 1, 2008, pp. 4069-4078.

* cited by examiner

*Primary Examiner* — Karl Group
(74) *Attorney, Agent, or Firm* — Cooper Legal Group, LLC

(57) ABSTRACT

The invention relates to a molten cast refractory product comprising, in weight percentages on the basis of the oxides and relative to a total of 100% of the oxides:
$ZrO_2+Hf_2O$ is the remainder making up 100%,
$4.5\% < SiO_2 < 6.0\%$,
$0.80\% \leq Al_2O_3 < 1.10\%$,
$0.3\% < B_2O_3 < 1.5\%$,
$Ta_2O_5+Nb_2O_5 < 0.15\%$,
$Na_2O+K_2O < 0.1\%$,
$K_2O < 0.04\%$,
$CaO+SrO+MgO+ZnO+BaO < 0.4\%$,
$P_2O_5 < 0.05\%$,
$Fe_2O_3+TiO_2 < 0.55\%$,
and other oxide species <1.5%,
the "A/B" ratio of the $Al_2O_3/B_2O_3$ contents by weight being between 0.75 and 1.6. The invention can be applied to glass melting furnaces.

10 Claims, No Drawings

REFRACTORY PRODUCT HAVING HIGH ZIRCONIA CONTENT

FIELD OF TECHNOLOGY

The invention relates to a new fused cast refractory product having a high zirconia content.

Prior art

Among refractory products, a distinction is made between fused cast products, well known for the construction of glass melting furnaces, and sintered products.

In contrast to sintered products, the fused cast products most often comprise an intergranular vitreous phase binding crystalline grains. The problems posed by sintered products and by fused cast products, and the technical solutions adopted for solving them, are therefore generally different. A composition developed for making a sintered product is therefore not usable as such a priori for making a fused cast product, and vice versa.

The fused cast products, often called electrocast products, are obtained by melting a mixture of suitable raw materials in an electric arc furnace or by any other technique that is suitable for these products. The molten material is then cast in a mold, and the product obtained undergoes a controlled cooling cycle so that it reaches room temperature without cracking. This operation is called "annealing" by a person skilled in the art.

Among the fused cast products, the electrocast products with high zirconia content, i.e. having more than 85 wt % of zirconia ($ZrO_2$), have a reputation for their quality of very high corrosion resistance without coloration of the glass produced and without generating defects.

Conventionally, the fused cast products with high zirconia content also comprise sodium oxide ($Na_2O$) to prevent the formation of zircon from the zirconia and silica present in the product. The formation of zircon is in fact harmful since it is accompanied by a decrease in volume of the order of 20%, thus creating mechanical stresses that cause cracking.

The product ER-1195 produced and marketed by Saint-Gobain SEFPRO and covered by patent EP-B-403 387 is now widely used in glass melting furnaces. Its chemical composition comprises about 94% zirconia, 4 to 5% silica, about 1% alumina, 0.3% sodium oxide and less than 0.05 wt. % $P_2O_5$. It is typical of products with high zirconia content used for glass furnaces.

FR 2 701 022 describes fused cast products with high zirconia content that contain 0.05 to 1.0 wt. % of $P_2O_5$ and 0.05 to 1.0 wt. % of boron oxide $B_2O_3$. These products have a high electrical resistivity. Advantageously, this makes it possible to stabilize the electric power consumption during electric melting of glass and in particular avoid any problem of short circuiting in the refractory products leading to their rapid degradation. In fact, during electric melting of glass, some of the electric current passes through the refractory products. The increase in the resistivity of these refractory products therefore makes it possible to reduce the amount of electric current able to pass through them.

WO 2009 027610 describes fused cast products with high zirconia content having a high electrical resistivity in the presence of at least one oxide selected from $Nb_2O_5$ and $Ta_2O_5$ for silica contents between 6 and 12%.

WO 2007 099253 describes fused cast products with high zirconia content having a high electrical resistivity in the presence of at least one oxide selected from $CrO_3$, $Nb_2O_5$, $MoO_3$, $Ta_2O_5$ and $WO_3$. These products contain less than 1.5 wt. % of $B_2O_3$ for alumina contents between 0.1 and 2.4%.

WO 2005 068393 describes fused cast products with high zirconia content having a high electrical resistivity while minimizing the contents of BaO, SrO, MgO, CaO, $P_2O_5$, $Na_2O$ and $K_2O$. These products contain 0.1 wt. % to 1.2 wt. % of $B_2O_3$ and between 0.8% and 2.5% of alumina, but no attention is drawn to the $Al_2O_3/B_2O_3$ ratio. Further, none of the examples in this document includes an alumina content of less than 0.85%; an alumina content of greater than 0.9% is preferred.

JP 63 285173 describes fused cast products with high zirconia content having a good electrical resistivity and resistance to cracking for silica contents less than 6.5%.

The current development of glasses of very high quality, in particular glasses for flat screens of the LCD type, increases the requirements for the refractory products of glass melting furnaces. In particular, there is a need for refractory products with improved electrical resistivity, without having to use dopants, while having resistance to corrosion by glass.

The present invention aims to satisfy this need.

SUMMARY OF THE INVENTION

More particularly, the invention relates to a fused cast refractory product comprising, in percentages by weight based on the oxides and for a total of 100% of the oxides:

$ZrO_2+Hf_2O$: complement to 100%
$4.5\% < SiO_2 < 6.0\%$
$0.80\% \leq Al_2O_3 < 1.10\%$
$0.3\% < B_2O_3 < 1.5\%$
$Ta_2O_5+Nb_2O_5 < 0.15\%$
$Na_2O+K_2O < 0.1\%$
$K_2O < 0.04\%$
$CaO+SrO+MgO+ZnO+BaO < 0.4\%$
$P_2O_5 < 0.05\%$
$Fe_2O_3+TiO_2 < 0.55\%$
other oxide species: <1.5%,
the ratio "A/B" of the contents by weight $Al_2O_3/B_2O_3$ being between 0.75 and 1.6.

As will be seen later, surprisingly, the inventors discovered that this composition allows the refractory product according to the invention to have a good electrical resistivity and a good corrosion resistance, even though the content of dopant $Ta_2O_5$ and/or $Nb_2O_5$ is less than 0.15%.

A refractory product according to the invention can further comprise one or more of the following optional characteristics:

- The ratio NB of the contents by weight $Al_2O_3/B_2O_3$ is less than 1.5, preferably less than 1.2, less than 1.1, or even less than 1.0.
- The content by weight of $ZrO_2+HfO_2$ is less than 95.5%, or even less than 95.0%, or even less than 94.0% and/or greater than 90.0%, or greater than 91.0%, or even greater than 92.0%.
- The content by weight of silica $SiO_2$ is greater than 4.6%, greater than 4.8%, greater than 4.9%, and/or less than 5.8%, less than 5.5%.
- The content by weight of alumina $Al_2O_3$ is less than 1.05%, less than 1.00%, less than 0.90%, less than 0.85%.
- The content by weight of alumina is greater than 0.80%.
- The content by weight of $B_2O_3$ is greater than 0.35%, or even greater than 0.40%, or even greater than 0.45%.
- The content by weight of $B_2O_3$ is less than 1.20%, or even less than 1.0%, or even less than 0.80%, less than 0.70%, or less than 0.60%, or less than 0.55%.

The content by weight of ($Ta_2O_5+Nb_2O_5$) is less than 0.10%, less than 0.05% or is even virtually zero.

The content by weight of ($Na_2O+K_2O$) is less than 0.04%.

The oxides of iron and/or of titanium and/or of calcium and/or of strontium and/or of barium and/or of magnesium and/or of zinc and/or of phosphorus are only present as impurities.

The content by weight of oxides of iron and/or of titanium, $Fe_2O_3+TiO_2$, is less than 0.4%, preferably less than 0.3%, preferably less than 0.2%.

The content by weight of oxide of calcium and/or of strontium and/or barium and/or of magnesium and/or of zinc is less than 0.2%, preferably less than 0.1%.

The total content by weight of oxides of calcium and/or of strontium and/or barium and/or of magnesium and/or of zinc, $CaO+SrO+BaO+MgO+ZnO$, is less than 0.3%, preferably less than 0.2%, less than 0.1%, less than 0.05%.

The total content by weight of the "other oxide species" is less than 1.0%, less than 0.6%, less than 0.5%, or even less than 0.3%.

The "other oxide species" only consist of impurities and the total content by weight of the "other oxide species" is less than 0.6%, less than 0.5%, or even less than 0.3%.

The content by weight of yttrium oxide $Y_2O_3$ is less than 1.0%, preferably less than 0.5%, more preferably less than 0.4%, or even less than 0.3%, or less than 0.25%.

The content by weight of tin and/or copper oxides, $SnO_2+CuO$, is less than 0.05%.

The invention also relates to a method for manufacturing a refractory product according to the invention, comprising the following successive steps:

a) mixing raw materials so as to form an initial charge,
b) melting said initial charge until a molten material is obtained,
c) casting and solidification of said molten material, by cooling, so as to obtain a refractory product, said method being characterized in that said raw materials are selected so that said refractory product is according to the invention.

Preferably, oxides for which a minimum content is required, notably $ZrO_2$, $SiO_2$, $B_2O_3$ or precursors of these oxides, are added systematically and methodically. Preferably, the contents of these oxides in the sources of the other oxides, where they are conventionally regarded as impurities, are taken into account.

Preferably, cooling is controlled, preferably so as to be carried out at a rate of less than 20° C. per hour, preferably at a rate of about 10° C. per hour.

The invention also relates to a glass melting furnace comprising a refractory product according to the invention, or a refractory product manufactured or that can be manufactured by a method according to the invention, in particular in a region intended to be in contact with molten glass. In a furnace according to the invention, the refractory product can advantageously form part of a tank for making glass by melting, notably by electric melting, where it may come in contact with molten glass at a temperature greater than 1200° C.

DEFINITIONS

The contents of oxides by weight refer to the total contents for each of the corresponding chemical elements, expressed in the form of the most stable oxide, according to the convention that is usual in the industry; therefore this includes the suboxides and optionally nitrides, oxynitrides, carbides, oxycarbides, carbonitrides, or even the metallic species of the aforementioned elements.

A "molten material" is a liquid mass which, to conserve its shape, must be contained in a container. It can contain some solid particles, but of an insufficient amount to be able to structure said mass.

"Impurities" means the inevitable constituents, introduced unintentionally and necessarily with the raw materials or resulting from reactions with these constituents.

The impurities are not necessary constituents, but are merely tolerated. For example, the compounds included in the group of the oxides, nitrides, oxynitrides, carbides, oxycarbides, carbonitrides and metallic species of iron, titanium, vanadium and chromium are impurities.

"Dopant" here means the $Ta_2O_5$ and/or $Nb_2O_5$ constituents.

Unless stated otherwise, all the contents of oxides in the products described and claimed are percentages by weight based on the oxides.

DETAILED DESCRIPTION OF THE INVENTION

In a fused cast product according to the invention, high content of zirconia $ZrO_2$ makes it possible to meet the requirements of high corrosion resistance without coloration of the glass produced and without producing defects that impair the quality of said glass.

In a product obtained by melting, $HfO_2$ cannot be dissociated chemically from $ZrO_2$. In the chemical composition of such a product, $ZrO_2+HfO_2$ therefore denotes the total content of these two oxides. However, according to the present invention, $HfO_2$ is not added deliberately in the initial charge. $HfO_2$ therefore only denotes traces of hafnium oxide, this oxide always being naturally present in sources of zirconia at contents generally less than 2%. For clarity, the content of zirconia and traces of hafnium oxide can therefore be denoted either by $ZrO_2+HfO_2$ or by $ZrO_2$, or by "zirconia content".

The content of hafnium oxide $HfO_2$ in a product according to the invention is less than 5%, generally less than 2%.

The presence of silica $SiO_2$ notably permits the formation of an intergranular vitreous phase that can effectively accommodate the changes in volume of the zirconia during its reversible allotropic transformation, i.e. during transition from the monoclinic phase to the tetragonal phase.

However, addition of silica must be limited in order to obtain high corrosion resistance. Moreover, too high a content of silica might cause defects in the glass through detachment of stones (pieces of refractory product resulting from loss in cohesion of the product), which is regarded as poor behavior in application.

The presence of alumina promotes the formation of a stable vitreous phase and improves the castability of the products in the mold. An excessive content leads to instability of the vitreous phase (formation of crystals), which has an adverse effect on feasibility, in particular in the presence of boron oxide. The content by weight of alumina must therefore remain limited.

The presence of a content by weight of $B_2O_3$ in a proportion such that the ratio A/B of the contents by weight $Al_2O_3/B_2O_3$ is less than or equal to 1.6 makes it possible to increase the electrical resistivity.

The oxides $Na_2O$ and $K_2O$ have an adverse influence on electrical resistivity. The content by weight of $Na_2O+K_2O$ must therefore be less than 0.10%. In particular the content of $K_2O$ must be less than 0.04%.

According to the invention, the content by weight of $Fe_2O_3+TiO_2$ is less than 0.55% and that of $P_2O_5$ is less than 0.15%, preferably less than 0.10%, more preferably less than 0.05%. In fact, these oxides are known to be harmful and their content must preferably be limited to traces introduced as impurities with the raw materials.

Unless stated otherwise, the "other oxide species" are the species that are not listed above, namely species other than $ZrO_2$, $Hf_2O$, $SiO_2$, $Al_2O_3$, $B_2O_3$, $Ta_2O_5$, $Nb_2O_5$, $Na_2O$, $K_2O$, CaO, SrO, MgO, ZnO, BaO, $P_2O_5$, $Fe_2O_3$ and $TiO_2$. In one embodiment, the "other oxide species" are limited to species whose presence is not particularly desired and which are generally present as impurities in the raw materials.

Conventionally, in a fused cast product, the oxides represent more than 98.5%, more than 99%, or even roughly 100% of the mass of the product. It is the same in a product according to the invention.

A product according to the invention can be manufactured conventionally according to steps a) to c) described less than:
a) mixing raw materials so as to form an initial charge,
b) melting said initial charge until a molten material is obtained,
c) solidification of said molten material, by cooling, so as to obtain a refractory product according to the invention.

In step a), the raw materials are selected so as to guarantee the contents of oxides in the finished product.

In step b), melting is preferably effected through the combined action of a fairly long electric arc, not causing reduction, and mixing which promotes reoxidation of the products.

To minimize the formation of nodules of a metallic appearance and prevent the formation of cracks or crazing in the final product, it is preferable to perform melting in oxidizing conditions.

The long-arc melting process described in French patent No. 1 208 577 and its additions No. 75893 and 82310 is preferably used.

This process consists of using an arc furnace whose arc is struck between the charge and at least one electrode some distance from said charge and adjusting the length of the arc so that its reducing action is minimized, while maintaining an oxidizing atmosphere above the molten bath and mixing said bath, either by the action of the arc itself, or by bubbling an oxidizing gas (air or oxygen, for example) in the bath or by adding substances that release oxygen, such as peroxides or nitrates, to the bath.

Melting can in particular take place at a temperature greater than 2300° C., preferably between 2400° C. and 2500° C.

In step c), cooling is preferably carried out at a rate of less than 20° C. per hour, preferably at a rate of about 10° C. per hour.

A product of the invention manufactured in this way consists of grains of zirconia surrounded by a vitreous phase. The zirconia can be monoclinic to more than 80%, more than 90%, more than 99% or roughly 100%, as percentage by weight. The vitreous phase can comprise more than 50%, or even more than 70%, of silica, between 5% and 20% of $B_2O_3$ and between 1% and 20% of alumina, in percentages by weight based on the vitreous phase. The silica, $B_2O_3$ and alumina can represent more than 95%, more than 97%, or even roughly 100% of the weight of the vitreous phase.

Any conventional method of manufacturing fused products based on zirconia intended for applications in glass melting furnaces can be employed, provided that the composition of the initial charge allows products to be obtained having a composition according to that of a product according to the invention.

EXAMPLES

The following non-limiting examples are given for the purpose of illustrating the invention.

In these examples, the following raw materials were used:
zirconia containing mainly, on average by weight, 98.5% $ZrO_2+HfO_2$, 0.2% $SiO_2$ and 0.02% $Na_2O$,
zircon sand at 33% silica,
boron oxide of purity greater than 99%.

The raw materials were melted by the conventional process of arc furnace melting and then the molten material was cast to obtain blocks with the dimensions 220 mm×450 mm×150 mm.

Example 1 corresponds to the product ER1195, marketed by Saint-Gobain SEFPRO, and constitutes the reference.

For all the products obtained, crystallographic analysis reveals crystals of monoclinic zirconia surrounded by a vitreous phase typically having more than 70% of silica. All of the silica as well as the other oxide species with the exception of zirconia are in the vitreous phase.

The chemical analysis of the products obtained is given in Table 1; this is an average overall chemical analysis, given in percentages by weight.

In the following Table 1, * indicates that the example is outside of the invention, and an empty cell corresponds to a content less than or equal to 0.05 wt. %.

Cylindrical bars of product 30 mm in diameter and 30 mm high were extracted from the various examples of blocks produced. These bars were submitted to a potential difference of 1 volt at a frequency of 100 hertz at 1500° C. or 1600° C. respectively for measuring the electrical resistivity, "R1500" and "R1600" respectively.

TABLE 1

Compositions by weight (as percentage based on oxides)

| | $ZrO_2$ (%) | $SiO_2$ (%) | $B_2O_3$ (%) | $Al_2O_3$ (%) | $Na_2O$ (%) | A/B | R1500 (Ω · cm) | R1600 (Ω · cm) |
|---|---|---|---|---|---|---|---|---|
| 1* | Complement to 100% | 4.0 | | 1.20 | 0.3 | | 70 | |
| 2* | | 4.5 | 0.4 | 0.80 | | 2.0 | 110 | 80 |
| 3 | | 4.9 | 0.8 | 0.89 | | 1.1 | 184 | 127 |
| 4 | | 5.3 | 0.8 | 0.92 | 0.09 | 1.1 | 131 | 90 |

The results show that the products of the invention tested have greater electrical resistivity than that of product ER1195 (example 1).

Comparison of example 2* with examples 3 or 4 shows that a decrease in the ratio NB has a very positive effect on the electrical resistivity.

Moreover, a further experiment was conducted on product containing 5.0% of silica, 1.4% of $B_2O_3$ and 0.80% of alumina for an NB ratio of 0.57: the excessive viscosity of its vitreous phase led to a low exudation resistance. It is therefore preferable to maintain the A/B ratio at levels greater than or equal to 0.75%.

Finally, measurements showed that the resistance to corrosion by molten glass of the products of the invention is equivalent to that of the reference example 1*.

Of course, the present invention is not limited to the embodiments in the examples, which are given for purposes of illustration.

The invention claimed is:
1. A fused cast refractory product comprising, in percentages by weight based on the oxides and for a total of 100% of the oxides:

$ZrO_2+Hf_2O$: complement to 100%
$4.5\% < SiO_2 < 6.0\%$
$0.80\% \leq Al_2O_3 < 1.10\%$
$0.3\% < B_2O_3 < 1.5\%$
$Ta_2O_5+Nb_2O_5 < 0.15\%$
$Na_2O+K_2O < 0.1\%$
$K_2O < 0.04\%$
$CaO+SrO+MgO+ZnO+BaO < 0.4\%$
$P_2O_5 < 0.05\%$
$Fe_2O_3+TiO_2 < 0.55\%$
other oxide species: <1.5%,
the ratio "A/B" of the contents by weight $Al_2O_3/B_2O_3$ being between 0.75 and 1.6.

2. The product as claimed in claim 1, wherein the ratio A/B is less than 1.5.

3. The product as claimed in claim 2, wherein the ratio A/B is less than 1.2.

4. The product as claimed in claim 1, wherein $Nb_2O_5+Ta_2O_5 < 0.10\%$.

5. The product as claimed in claim 4, wherein $Nb_2O_5+Ta_2O_5 < 0.05\%$.

6. The product as claimed in claim 1, wherein the content by weight of silica $SiO_2$ is greater than 4.8%.

7. The product as claimed in claim 1, wherein the content by weight of $B_2O_3$ is less than 1.0%.

8. The product as claimed in claim 1, wherein the content by weight of $Y_2O_3$ is less than 0.25%.

9. The product as claimed in claim 1, wherein the content by weight of $Na_2O+K_2O$ is less than 0.04%, the content by weight of oxides of iron and/or of titanium, $Fe_2O_3+TiO_2$, is less than 0.4%, the content by weight of $P_2O_5$ is less than 0.05%, the total content by weight of oxides of calcium and/or of strontium and/or of barium and/or of magnesium and/or of zinc, $CaO+SrO+BaO+MgO+ZnO$, is less than 0.3%, and the total content by weight of "other oxide species" is less than 0.6%.

10. A glass melting furnace comprising a product as claimed in claim 1 in a region intended to be in contact with molten glass.

* * * * *

UNITED STATES PATENT AND TRADEMARK OFFICE
CERTIFICATE OF CORRECTION

PATENT NO. : 8,796,167 B2  
APPLICATION NO. : 13/575568  
DATED : August 5, 2014  
INVENTOR(S) : Isabelle Cabodi Page 1 of 1

It is certified that error appears in the above-identified patent and that said Letters Patent is hereby corrected as shown below:

IN THE SPECIFICATION

Column 2, line 50, please delete "NB," and insert therefor --A/B--.

Column 6, line 49, please delete "NB," and insert therefor --A/B--.

Column 6, line 53, please delete "NB," and insert therefor --A/B--.

Signed and Sealed this
Seventeenth Day of May, 2016

Michelle K. Lee
*Director of the United States Patent and Trademark Office*